Jan. 8, 1957. K. E. HUNTER 2,777,111
METHOD OF GEOPHYSICAL EXPLORATION
Filed Nov. 24, 1954 3 Sheets-Sheet 1

KENNETH E. HUNTER
INVENTOR.

BY Rudolph L. Quick
ATTORNEY

KENNETH E. HUNTER
INVENTOR.

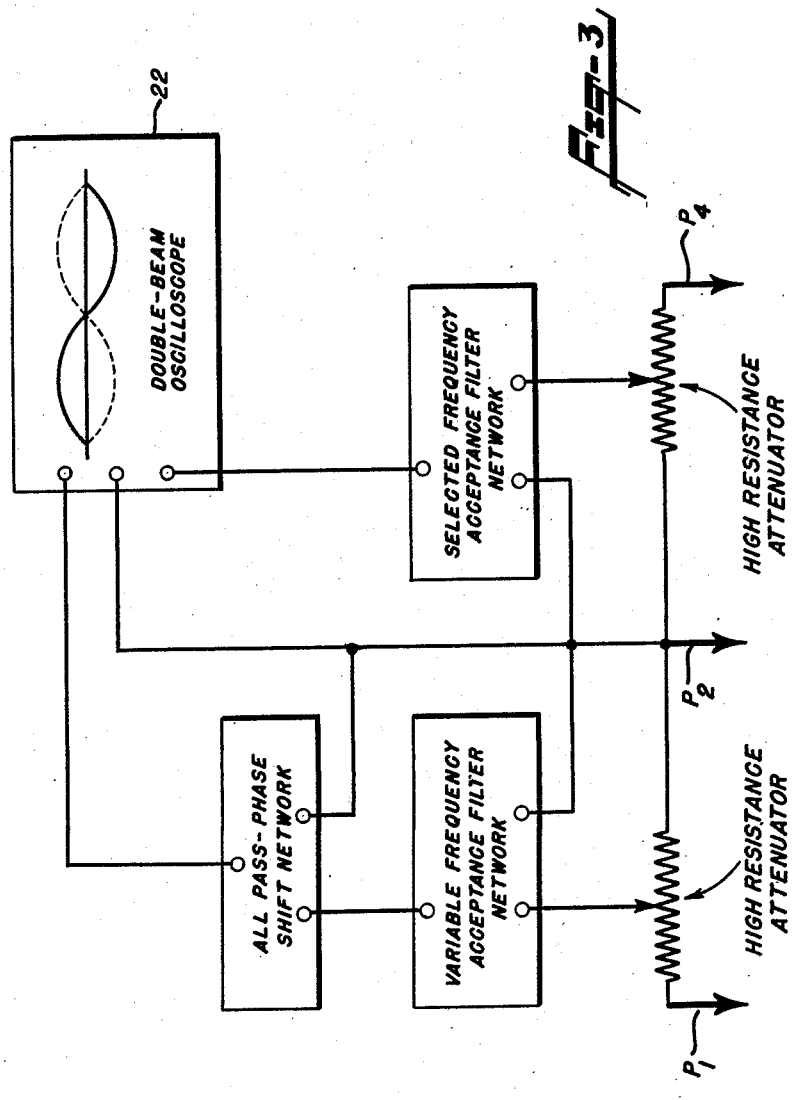

United States Patent Office 2,777,111
Patented Jan. 8, 1957

2,777,111

METHOD OF GEOPHYSICAL EXPLORATION

Kenneth E. Hunter, Tsumeb, South West Africa, assignor to Newmont Mining Corporation, New York, N. Y., a corporation of Delaware Application November 24, 1954, Serial No. 470,868

12 Claims. (Cl. 324—1)

This invention relates to geophysical exploration and more particularly to a novel method for detecting the presence of a sub-surface mineralization.

Metallic ores generally are found in nature in the form of sulphides having a relatively high conductivity compared to that of the surrounding medium. This characteristic has given rise to various methods for ascertaining the presence of sub-surface zones or bodies, of metallic ores. Generally, a time-varying charging current is caused to flow through a selected region of ground and the resultant potentials are observed across a pair of pick-up electrodes inserted in the ground surface at points spaced from the charging current electrodes.

Reference is made to United States Patent No. 2,611,004 issued September 16, 1952, to A. A. Brant and E. A. Gilbert and entitled "Geophysical Exploration." This patent discusses the charging and polarizing effects at sulphide particle surfaces in a time-varying magnetic field. Also, in the co-pending United States application Serial No. 273,422 filed February 26, 1952, by James R. Wait, Harold O. Seigel, Leonard Collett, William E. Bell and Arthur A. Brant, and entitled "Method and Apparatus For Geophysical Exploration," there is dislosed a method wherein a succession of current frequencies in the range of 0.1 to 100 cycles per second are applied to the ground through a pair of grounded current electrodes and the voltage response is measured across a pair of pick-up electrodes. Such voltage is compared in amplitude and phase to the voltage drop across a resistive-capacitive impedance that is inserted into the charging current circuit. Measurements, at a given station, may be made at a single or succession of frequencies in the range of 0.1 to 100 cycles per second. In this frequency range it is noted that the presence of scattered sulphide particles, for example, pyrite, in an otherwise unmineralized rock medium provides, at any given frequency, a large phase angle factor (or a factor which is the quotient of the apparent dielectric constant divided by conductivity) as compared to the comparable factors for an unmineralized region. Also, the variation of the apparent conductivity, with frequency, provides a similar diagnostic factor.

The present invention differs from that disclosed in the above-referenced application in that I utilize natural earth currents directly for the determination of the quotient of the dielectric constant divided by conductivity and/or the apparent conductivity of the ground between two sets of spaced pick-up electrodes.

An object of this invention is the provision of a method of determining the presence of sub-surface scattered sulphide mineralization by obtaining a selected frequency component of the natural earth potential difference existing between two sets of pick-ups, and determining the phase angle or the quotient of the apparent dielectric constant divided by the conductivity of the earth section at said component frequency.

An object of this invention is the provision of a method of establishing the presence of sub-surface scattered sulphide mineralization of determining the phase angle or the quotient of the apparent dielectric constant divided by the apparent conductivity of a selected region of the earth at a selected frequency component of the natural earth currents, said frequency component lying in the range of $1/100$ to 10 cycles per second.

An object of this invention is the provision of a method of establishing the presence of sub-surface scattered sulphide mineralization which method comprises obtaining voltages across two sets of spaced pick-up electrodes inserted into the earth region to be investigated, said voltages arising solely by reason of the natural earth currents; selecting a component of said voltages having a frequency in the range of $1/100$ to 10 cycles per second; obtaining the relative phase angle between said selected voltage components, moving one set of electrodes to a succession of different positions and determining the phase angle between said selected voltage components for each new position of said electrodes; the magnitude of said phase angle being taken as diagnostic of the presence or absence of sub-surface mineralization in the region of the electrodes.

These and other objects and advantages will become apparent from the following description when taken with the accompanying drawings. It will be understood the drawings are for the purposes of illustration and are not to be construed as defining the scope or limits of the invention, reference being had for the latter purpose to the appended claims.

In the drawings wherein like reference characters denote like parts in the several views:

Figure 3 is a diagrammatic representation of a three (3) electrode array.

In the following discussion the dielectric constant factor is taken at any frequency as equal to the angular velocity of that frequency multiplied by the apparent dielectric constant and divided by the apparent conductivity of the medium. The so-defined dielectric constant factor is not equal to and is not the dielectric constant as defined in conventional practice.

The presence of scattered sulphide particles, e. g., pyrite, chalcopyrite, galena, molybdenite, in an otherwise unmineralized rock medium provides a large apparent dielectric constant factor, or phase angle, relative to the comparable unmineralized medium at any given low frequency and, therefore, such factor in itself is a criterion for sulphide mineralization. Where scattered sulphide mineralization is present the value of the dielectric constant, at frequencies of $1/100$ to 10 cycles per second, is a relatively high constant value, whereas the graph for a barren medium is a relatively horizontal line up to about a few hundred cycles per second, see Figure 2.

In the case of the scattered porphyry-type of copper deposits, these are usually thousands of feet in dimensions so that for prospecting by means of any electrode array the pick-up electrodes can be spaced apart a thousand feet or so. In such arrangement, the natural earth potentials observed across the pick-up electrodes are of the order of millivolts, a magnitude readily measurable by means of a vacuum tube voltmeter or an amplifier and oscilloscope arrangement.

In a specific instance wherein the pick-up electrodes were spaced apart 500 feet and the earth currents were observed at 12 second intervals, I found that such earth currents produced a one (1) millivolt potential across the electrodes and that such earth currents included a wide range of frequency components. There was definitely present an approximate 40 second period component and a 100 second component which are equal approximately to frequency components of $\frac{1}{40}$ and $\frac{1}{100}$ cycles per second. In the practice of my invention I select a fairly low range of frequencies for observation, said frequencies ranging from, say, $\frac{1}{100}$ cycle per second to 10 cycles per second.

Figure 1:
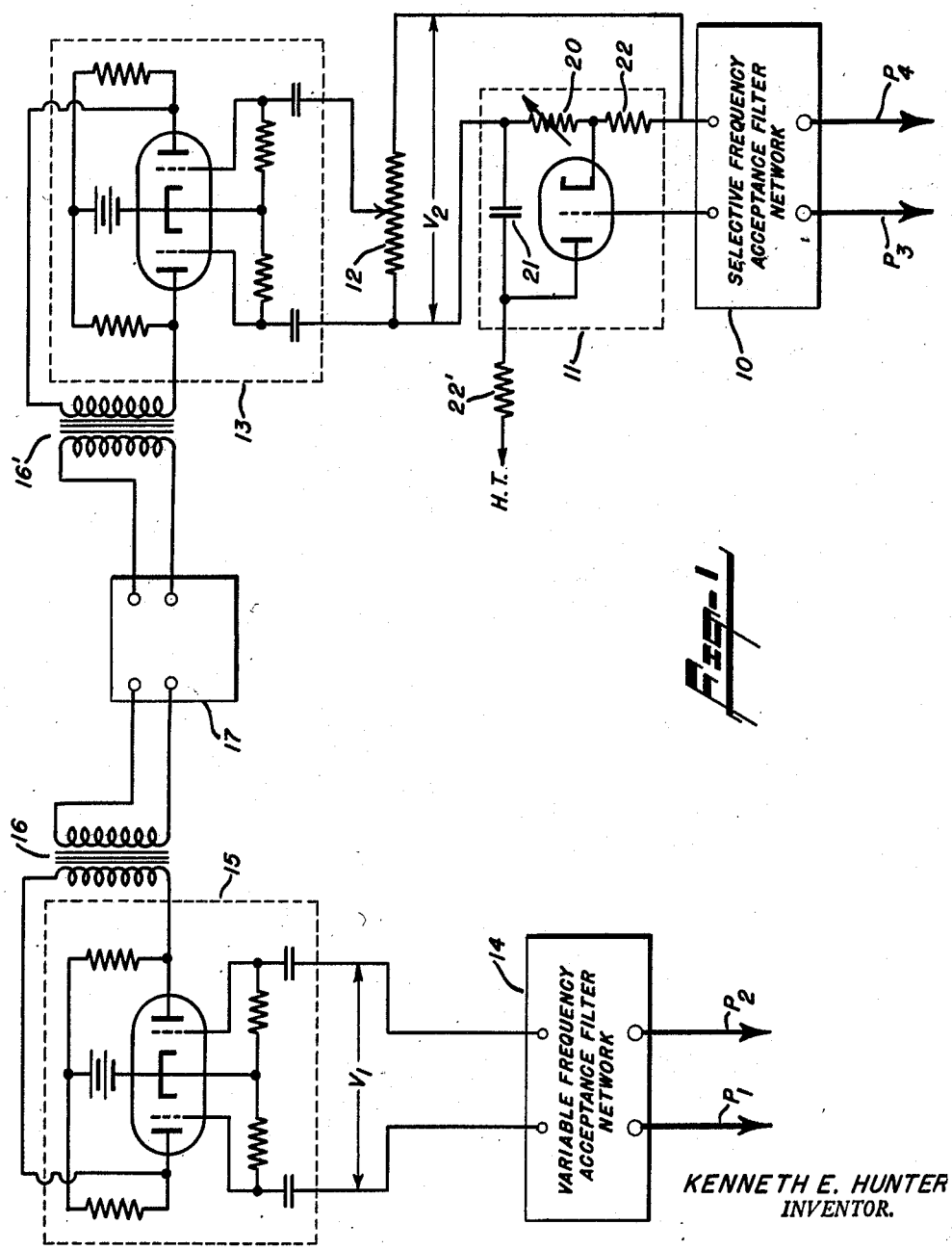
Figure 1 is a diagram of apparatus for use in practicing my invention.

Reference is now made to Figure 1 which is a diagram of apparatus used in the practice of the invention. Here $P_1$ and $P_2$ are a pair of movable stakes, or pick-up electrodes, and $P_3$ and $P_4$ are a pair of fixed reference electrodes. Each pair of pick-up electrodes is inserted into the ground and the spacing between the individual electrodes of each pair is of the order of 1000 feet. Since the voltage signals between each pair of pick-up electrodes, for a 1,000 foot separation, are of the order of one (1') millivolt and I wish to detect such signals to 1%, recordings readable to ±10 microvolts are required. This is attainable quite readily with modern techniques. The pick-up stakes $P_3$ and $P_4$ are connected to a selective frequency acceptance filter network 10 which can be tuned to a desired frequency. At $\frac{1}{10}$ cycle per second, e. g., a very usable frequency, a Q of 15 in the filter network is readily obtainable by using a parallel T and cascaded high-pass, low-pass arrangement well known in the electronic art. Such acceptance filter network can be set to any of a series of desired frequencies as, for example, $\frac{1}{100}$, $\frac{1}{30}$, $\frac{1}{10}$, $\frac{1}{3}$, 1, 3, etc., cycles per second.

The potential signals appearing across $P_3$, $P_4$, having been selectively filtered to a given, desired frequency, pass through an all pass, phase-shift network 11 which permits adjustment of phase without change in magnitude. This signal is then passed to the potentiometer 12 from which it is taken off and fed to a push-pull differential amplifier 13, said amplifier having a high input impedance to obviate pick-up electrode resistance considerations.

The potential signals appearing across the pick-up electrodes $P_1$, $P_2$ are likewise impressed across a variable frequency acceptance filter network 14 which network is set to the same frequency as the filter network 10 in the $P_3$, $P_4$ circuit. Such selected signal component is fed to the push-pull differential amplifier 15.

The outputs of the differential amplifiers 13 and 15 are connected to two, special, identical transformers 16, 16' which respond down to $\frac{1}{100}$ cycle per second, an operating range readily possible with present transformer core materials. The secondaries of the transformers are connected to a suitable detecting device 17 in opposed sense, said detecting device being any suitable apparatus such as a vacuum tube voltmeter, oscilloscope, or etc.

In practice, the phase network 11 and the potentiometer 12 are adjusted until zero signal results at the detector 16. The amplitude of the signal across $P_1$, $P_2$ is, then, a known fraction of that appearing across $P_3$, $P_4$ (as determined by the setting of the potentiometer) and the phase of the $P_1$, $P_2$ signal relative to that of $P_3$, $P_4$ can be read from the setting of the calibrated resistor 20 and the known condenser 21 in the phase network 11. The two equal necessary resistors are identified by the numerals 22, 22'.

The voltage drop, V, across any pair of pick-up electrodes, spaced "a" meters apart, will be proportional to $$\rho I a$$

where:

$\rho$ is the resistivity of the earth section in ohm meters,
I is the current flowing through the earth section in amperes per square metre, and
$a$ is the spacing between the electrodes in meters.

Now, $\rho$ is a function of the current frequency and contains a real (in-phase) and an imaginary (out-of-phase) part, the latter being due to the equivalent dielectric or polarization effects at relatively low frequencies. Therefore, V is proportional to $$Ia \frac{1}{\sigma(\omega) + i\omega \epsilon(\omega)}$$

which rationalized is $$Ia \frac{\sigma(\omega) - i\omega \epsilon(\omega)}{(\sigma(\omega))^2 + (\omega^2 \epsilon(\omega))^2}$$

where:

$\sigma$ is the conductivity of the earth section in mhos per meter,
$\omega$ is the angular velocity of the current frequency $f = 2\pi f$
$\epsilon$ is the apparent dielectric constant,
$\sigma(\omega)$ and $\epsilon(\omega)$ merely signify that $\sigma$ and $\epsilon$, as measured, are functions of frequency.

Figure 2:
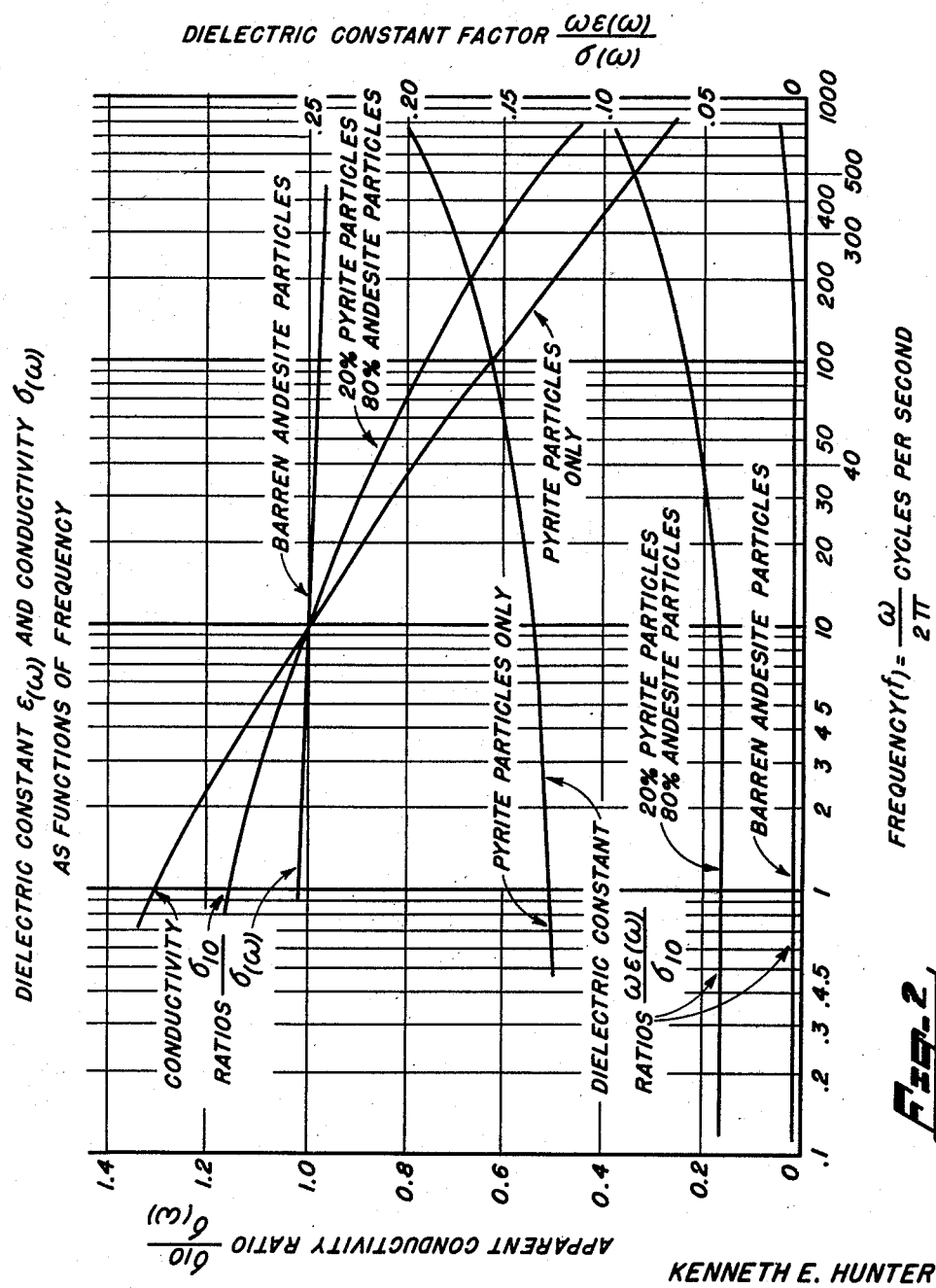
Figure 2 is a set of curves illustrating the variation of the apparent dielectric constant and conductivity of a barren and a mineralized medium, consisting of rock particles and pyrite in an electrolyte, as a function of the frequency of a current flowing through the medium.

Reference is now made to Figure 2 which is a set of curves showing the variation of the apparent dielectric constant factor and conductivity of certain media, consisting of rock particles in an electrolyte, as a function of the frequency of the current flowing through the medium. The variations of the apparent dielectric constant factor and conductivity are shown for three different mediums, namely, 1. Particles of pyrite only,
2. 20%, by volume, pyrite particles mixed with 80% andesite particles,
3. Particles of andesite only.

From these curves it is quite evident that the apparent dielectric constant factor of the pyrite particles in the frequency range 0.1 to 10, is large and decreases as the volume ratio of pyrite particles to andesite particles is decreased. For the andesite alone the apparent dielectric constant factor is markedly low. Also, the conductivity is, in general, a decreasing function with frequency. This change with frequency is less pronounced as the pyrite content is decreased. The magnitude and variation in these functions, with freqeuncy, presents a means for recognizing the presence of mineralization in a sub-surface medium. For a more detailed discussion of charging and polarization effects at sulphide particle surfaces reference is made to the above-referenced Patent No. 2,611,004. Reference is also made to the above-referenced co-pending application Serial No. 273,422 for a more detailed discussion of the apparent dielectric constant as a diagnostic factor.

From Figure 2 it is evident that at the low frequencies of less than a few hundred cycles per second the dielectric constant factor $$\frac{\omega \epsilon(\omega)}{\sigma(\omega)}$$

is very small for an unmineralized medium. Thus, $\omega \epsilon(\omega)$ can be neglected relative to $\sigma(\omega)$ for such a medium.

If we place the pick-up electrodes $P_3$, $P_4$ over a known unmineralized earth section the voltage appearing across such electrodes, $(V_{P_3}P_4)$, is proportional to $\sigma \omega$ at $P_3P_4$ for a frequency $f$. Then, the voltage appearing across the pick-up electrodes $P_1$, $P_2$, $(V_{P_1}P_2)$, is $rV_{P_3}P_4$, with a phase angle $\theta$ relative to $V_{P_3}P_4$, where $r$ is the attenuation factor of the potentiometer 12, see Figure 1, and $\theta$ is the phase angle determined by the value of the resistor 20 in the phase shift network 11.

$\sigma \omega$ at $V_{P_1}P_2$ is, then, proportional to $rV_{P_3}P_4 \cos \theta$, and $\omega \xi(\omega)$ at $V_{P_1}P_2$ is proportional to $rV_{P_3}P_4 \sin \theta$.

Hence, the dielectric constant factor $$\frac{\omega \xi \omega}{\sigma(\omega) \omega}$$

at $P_1P_2$ is equal to $\tan \theta$, a directly observable quantity.

$$\tan \theta = \omega c r$$

where:

$\omega$ is the known frequency multiplied by $2\pi$,
$c$ is the value of the fixed condenser 21 in farads, and
$r$ is the value of the variable resistor 20 in ohms.

For fixed, or known, values of $\omega$ and $c$, resistor 20 may be calibrated to read $\tan \theta$ directly, that is, to read the dielectric constant factor directly. The mere magnitude of this factor, at a given frequency, is diagnostic for the presence or absence of sulphides in the region of the pick-up stakes $P_1$, $P_2$.

If, however, a frequency response curve is desired another component frequency, $(\omega')$, is selected. As above, $\sigma\omega'$ at $V_{P_1P_2}$ is proportional to $rV'_{P_3P_4}\cos\theta'$ for the frequency $\omega'$. Since the locality of $P_3P_4$ is barren of mineralization $V_{P_3P_4} = V'_{P_3P_4}$, so that at $P_1P_2$ $$\frac{\sigma(\omega)}{\sigma(\omega')} = \frac{r \cos \theta}{r \cos \theta'}$$

Thus, the curve $$\frac{\sigma(\omega)}{\sigma(\omega')}$$

vs. the log of frequency can be readily obtained where $\omega$ is the selected reference frequency. Also, the curve $$\frac{\omega\xi(\omega)}{\sigma(\omega)}$$

vs. log frequency can be taken from a series of observations as outlined above.

These plots are exemplified by the curves shown in Figure 2.

Actually $$\frac{\sigma(\omega)}{\sigma(\omega')}$$

is also directly diagnostic. If $\omega'$ is less than $\omega$, by say a factor of 10, and sulphides are present, then $$\frac{\sigma(\omega)}{(\omega')}$$

is markedly greater than one (1).

In the field the procedure, then, is to leave the stakes $P_3$, $P_4$ fixed and move the stakes $P_1$, $P_2$ to a succession of locations. At each location the frequency to be observed is selected by means of the acceptance filter network. The phase and magnitude of the signal appearing across the stakes $P_3$, $P_4$ are adjusted until a zero balance is indicated by the detector 17. The value of the dielectric constant factor $$\frac{\omega\xi(\omega)}{\sigma(\omega)}$$

is given directly by the tangent of the phase angle, that is, by the direct calibrated reading of the variable resistor 20.

As is evident from Figure 2, the value of $$\frac{\omega\xi(\omega)}{\sigma(\omega)}$$

the dielectric constant factor, is directly diagnostic of mineralization simply by its magnitude. Otherwise, observations may be made at a succession of frequencies in the $\frac{1}{100}$ to 10 cycle range and the above diagnostic factor or the ratio of $$\frac{\sigma 10}{\sigma(\omega)}$$

plotted against log frequency.

Another procedure is to make $P_2$ and $P_3$ a common electrode and use $P_1$, $P_2$ and $P_4$ as a system of three (3) equispaced pick-up electrodes and move all by steps equal to the spacing so that $P_2$, $P_4$ next occupies the original location of $P_1$, $P_2$. Figure 3 is a diagrammatic representation of such three electrode arrangement. The voltages across $P_1$, $P_2$, for the frequency selected, are brought to equality and 180° phase difference with those appearing across $P_2$, $P_4$ by impressing these voltages across the double beam oscilloscope 22 and balancing the two wave patterns in amplitude and phase, as shown by the solid and dotted curves. If necessary, to facilitate this operation, the oscilloscope may be of the long persistence type. The electrodes $P_1$, $P_2$ and $P_4$ are equispaced and $P_2$ and $P_4$ are positioned in a non-mineralized region of earth. For such first position of the electrodes $P_1$, $P_2$, the dielectric constant factor is $$\frac{w\sigma(\omega)}{\sigma(\omega)} = \tan \theta$$

relative to the presumed, or selected, non-mineralized location of $P_2$, $P_4$, and, again $\tan \theta$ is read directly from the calibration of the resistor 20.

The electrodes are now moved so that $P_2$, $P_4$ occupy the original location of $P_1$, $P_2$. In this second position of the electrode array, let the phase angle of the voltage across $P_1$, $P_2$ be $\theta$, relative to that across $P_2$, $P_4$, the latter now being in the position originally occupied by $P_1$, $P_2$. The phase angle of the voltage across $P_1$, $P_2$, in the second position, relative to the original position of $P_2$, $P_4$ is $\theta_1 + \theta$, whence $$\frac{w\sigma(\omega)}{\sigma(\omega)} = \tan (\theta_1 + \theta)$$

and so on.

It is here pointed out that the potential difference across a pair of pick-up stakes resulting from telluric earth currents is proportional to the rate of change of the earth's magnetic field in direction perpendicular to the current flow. Thus, it is possible to replace the pick-up electrodes $P_3$, $P_4$ by a relatively large coil or loop of several turns in the plane of $P_3$, $P_4$. The voltage across the coil terminals will be proportional to and 90 degrees out of phase with the potential difference obtained across $P_3$, $P_4$. Similarly, $P_1$ and $P_2$ may be replaced by a vertical coil oriented in the plane of $P_1$, $P_2$. Thus, a wholly parallel system may be derived using coils to replace the pick-up electrode pairs, or, alternatively, two coils connected in series may be used, said coils being located at the midpoints of $P_1$, $P_2$ and $P_2$, $P_4$ to replace the equispaced three electrode array.

Having now described my invention in detail in accordance with the patent statutes which I desire to protect by Letters Patent of the United States is set forth in the following claims.

I claim:

1. A method of establishing the presence or absence of sub-surface scattered sulphide mineralization within a selected region of earth, which method comprises obtaining a first voltage arising solely by reason of the flow of natural earth currents through the selected region of ground, obtaining a second voltage arising solely by reason of the flow of natural earth currents through another region of ground, and measuring the relative phase angle between specific components of the said two voltages which components have a common frequency falling within the range of $\frac{1}{100}$–10 cycles per second, the magnitude of the stated phase angle being taken as indicative of the presence or absence of mineralization within the selected region of ground.

2. A method of establishing the presence or absence of sub-surface scattered sulphide mineralization within a selected region of ground, which method comprises inserting a first set of spaced pick-up electrodes and a second set of spaced pick-up electrodes into the ground region to be investigated; detecting the voltages appearing across each set of pick-up electrodes, said voltages arising solely by reason of the flow of natural earth currents; selecting specific components of the said voltages, such components having a common frequency in the range of $\frac{1}{100}$–10 cycles per second; and measuring the relative phase angle between such voltage components, the magnitude of such phase angle being taken as indicative of the presence or absence of mineralization in the region investigated.

3. A method of establishing the presence or absence of sub-surface scattered sulphide mineralization which method comprises inserting a first set of spaced pick-up electrodes and a second set of pick-up electrodes into the ground region to be investigated; detecting the voltages appearing across each set of pick-up electrodes, said voltages arising solely by reason of the flow of natural earth currents; selecting a specific component of the said voltages, such components having a common frequency in the range of $1/100$–10 cycles per second; measuring the relative phase angle between the two voltage components at the selected component frequency; moving one set of pick-up electrodes to a succession of new positions and obtaining the relative phase angle between the similarly selected voltage components for each new position of the electrodes; the magnitudes of the stated phase angles being taken as indicative of the presence or absence of mineralization in the region investigated.

4. A method of establishing the presence or absence of sub-surface scattered sulphide mineralization which method comprises inserting a first set of spaced pick-up electrodes and a second set of spaced pick-up electrodes into the ground region being investigated; detecting the voltages appearing across each set of pick-up electrodes said voltages arising solely by reason of the flow of natural earth currents; impressing the stated voltages across filter networks tuned to pass only selected voltage components having a common frequency in the range of $1/100$–10 cycles per second; impressing one such voltage component upon a phasing network which includes a calibrated variable resistor; bucking the voltage output of said phasing network against the other voltage component; and adjusting the said variable resistor to establish equality in phase between the said voltage output of the phasing network and the said other voltage component, the value of the said variable resistor being taken as indicative of the presence or absence of mineralization in the earth region being investigated.

5. A method of establishing the presence of subsurface scattered sulphide mineralization, which method comprises inserting a first set of spaced pick-up electrodes and a second set of spaced pick-up electrodes into the ground region being investigated; detecting the voltages across each set of pick-up electrodes, said voltages arising solely by reason of the flow of natural earth currents; impressing said voltages across individual filter networks tuned to pass only selected voltage components having a common frequency in the range of $1/100$–10 cycles per second; and measuring the relative phase angle between such selected voltage components, the magnitude of such phase angle being taken as indicative of mineralization within the region spanned by one or the other set of pick-up electrodes and the relative sign of such phase angle being taken as indicative of mineralization within the region spanned by a specific one of said sets of pick-up electrodes.

6. The invention as recited in claim 5, wherein one set of pick-up electrodes is moved to a second position, and again measuring the relative phase angle between the same selected voltage components as in the first measurement, the variation in the magnitude of the stated phase angles being taken as indicative of the presence mineralization within the region encompassed by the two positions of the said one set of pick-up electrodes, and the relative sign of the stated phase angles being taken as indicative of the presence of mineralization in a specific region spanned by the said second set of pick-up electrodes.

7. A method of establishing the presence of subsurface scattered sulphide mineralization, which method comprises inserting an array of three equi-spaced pick-up electrodes $P_1$, $P_2$, and $P_3$, into the ground being investigated; detecting the voltages appearing across the electrode sets $P_1$—$P_2$ and $P_2$—$P_3$, said voltages arising solely by reason of the flow of natural earth currents; selecting a specific component of each such voltage, such components having a common frequency in the range of $1/100$–10 cycles per second; measuring the relative phase angle being said selected voltage components; moving the electrode array so that the electrodes $P_2$ and $P_3$ occupy the original positions of $P_1$ and $P_2$; and again measuring the relative phase angle between similar voltage components as in the first measurement, the variation in the magnitude of the stated phase angles for the two different positions of the electrode array being taken as indicative mineralization in the region of ground investigated.

8. A method of establishing the presence or absence of sub-surface scattered sulphide mineralization in a selected region of earth, said method comprising the measurement of the conductivity $\sigma$ between two points within the selected region of earth and at a frequency $f$ falling within the range of $1/100$–10 cycles per second, and measuring the conductivity between the same two points at another frequency $f'$ also falling within the range of $1/100$–10 cycles per second; the ratio $$\frac{\sigma_\omega}{\sigma_{\omega'}}$$

being taken as indicative of mineration where: $\omega = 2\pi f$ and $\omega' = 2\pi f'$.

9. A method of establishing the presence of sub-surface scattered sulphide mineralization, said method comprising inserting a pair of spaced pick-up electrodes into the ground being investigated; selecting a first component frequency $f$ of the natural earth currents in the range of $1/100$–10 cycles per second; measuring the relative conductivity $\sigma$ of the region between the electrodes at the frequency $f$; selecting a second component frequency $f'$ of the natural earth currents in the range of $1/100$–10 cycles per second, said second component frequency $f'$ being substantially to that of the first component frequency $f$; and again measuring the relative conductivity $\sigma'$ of the region between the electrodes at the frequency $f'$; the presence of mineralization in the region between the electrodes being established when the ratio $\sigma/\sigma'$ is markedly greater than 1.

10. A method of establishing the presence of sub-surface scattered sulphide mineralization, said method comprising inserting a first set of spaced pick-up electrodes and a second set of spaced pick-up electrodes into the ground region being investigated; measuring the ratio of the voltages V1/V2 appearing across the two sets of pick-up electrodes at a frequency $f$ in the range of $1/100$–10 cycles per second, said voltages arising solely by reason of the flow of natural earth currents; measuring the voltage ratio V1/V2 appearing across the two sets of pick-up electrodes at a second frequency $f'$ also in the range of $1/100$–10 cycles per second, said voltages also arising solely by reason of the flow of natural earth currents; the magnitude of the two so-measured voltage ratios being taken as indicative of the presence of mineralization in the ground region investigated.

11. A method of establishing the presence or absence of sub-surface scattered sulphide mineralization, which method comprises inserting a first set of spaced pick-up electrodes and a second set of spaced pick-up electrodes into the ground region being investigated; detecting the voltages appearing across each set of pick-up electrodes, said voltages arising solely by reason of the flow of natural earth currents; impressing the said voltages across individual filter networks which are tuned to pass only selected first and second voltage components having a common frequency in the range of $1/100$–10 cycles per second; impressing the said first voltage component across the input terminals of a calibrated potentiometer; bucking the output voltage of the potentiometer against the said second voltage component; adjusting the potentiometer to obtain a first reading when the output voltage of the potentiometer is equal in magnitude to the said second voltage component; tuning both filter networks to pass voltage components having a different common frequency but also in the range of $1/100$–10 cycles per second; and again adjusting the said potentiometer to obtain a second reading when the output voltage of the potentiometer is equal in magnitude to second voltage component passed by the re-tuned filter network; the difference between the two readings of the potentiometer being taken as indicative of the presence of mineralization in the ground region being investigated.

12. Apparatus for use in making geophysical explorations comprising a first set of pick-up electrodes adapted for insertion into the ground; a second set of pick-up electrodes adapted for insertion into the ground; a first tunable filter network connected to the first set of pick-up electrodes; a first differential amplifier having its input connected to the first filter network; a second tunable filter network connected to the second set of pick-up electrodes; a phasing network energized by the voltage output of said second filter network said phasing network including a calibrated resistor; a calibrated potentiometer energized by the voltage output of said phasing network; a second differential amplifier having its input connected to the output terminals of the potentiometer; and means responsive to the difference in voltage output of the two differential amplifiers.

References Cited in the file of this patent

UNITED STATES PATENTS 2,611,004    Brant et al. _____ Sept. 16, 1952